(12) United States Patent
Koch

(10) Patent No.: US 7,875,121 B2
(45) Date of Patent: Jan. 25, 2011

(54) METHOD FOR MAINTAINING A PIPE COMPRISING A PARTICLE TRAP SYSTEM EXTENDING ALONG THE PIPE, AND DEVICES FOR CARRYING OUT THE METHOD

(75) Inventor: Hermann Koch, Gerhardshofen (DE)

(73) Assignee: Siemens AG, Munich (DE)

( * ) Notice: Subject to any disclaimer, the term of this patent is extended or adjusted under 35 U.S.C. 154(b) by 401 days.

(21) Appl. No.: 11/994,595

(22) PCT Filed: Jul. 4, 2006

(86) PCT No.: PCT/EP2006/063841

§ 371 (c)(1),
(2), (4) Date: Jan. 3, 2008

(87) PCT Pub. No.: WO2007/006685

PCT Pub. Date: Jan. 18, 2007

(65) Prior Publication Data

US 2008/0201876 A1    Aug. 28, 2008

(30) Foreign Application Priority Data

Jul. 7, 2005    (DE) .................. 10 2005 032 710

(51) Int. Cl.
*B08B 9/04*    (2006.01)
(52) U.S. Cl. ............................................. 134/8; 134/42
(58) Field of Classification Search .................. 134/8, 134/42; 15/3, 104.03, 104.05, 104.067, 104.19; 174/28; 138/104, 108, 112, 114
See application file for complete search history.

(56) References Cited

U.S. PATENT DOCUMENTS 5,406,666 A * 4/1995 Werlink .................. 15/104.12
5,899,795 A * 5/1999 Penza .......................... 451/61

* cited by examiner

*Primary Examiner*—Michael Barr
*Assistant Examiner*—Saeed T Chaudhry
(74) *Attorney, Agent, or Firm*—Laurence A. Greenberg; Werner H. Stemer; Ralph E. Locher

(57) ABSTRACT

A pipe maintenance method and device is particularly suited for maintaining a pipe of a gas-insulated high-voltage line with a particle trap system extending along the pipe. The novel method enables poorly accessible sections to be reached. To this end, a maintenance unit is displaced along the particle trap system, and it is guided thereby.

7 Claims, 1 Drawing Sheet

METHOD FOR MAINTAINING A PIPE COMPRISING A PARTICLE TRAP SYSTEM EXTENDING ALONG THE PIPE, AND DEVICES FOR CARRYING OUT THE METHOD

BACKGROUND OF THE INVENTION

Field of the Invention

The invention relates to a method for maintaining a pipe comprising a particle trap system extending along the pipe, and to devices for carrying out the method.

A pipe requiring maintenance is for example a jacket pipe of a gas-insulated line.

The jacket pipe surrounds a conductor, which is held in place by means of post insulators. Furthermore, to insulate the conductor the jacket pipe is filled with a suitable gas, for example $SF_6$. Particles, in particular metal particles, which enter the interior of the jacket pipe for example during assembly, may move, when voltage is applied to the conductor, in the resultant electrical field and impair insulation between jacket pipe and conductor as a result of this movement. The particles may also become attached to the post insulators and cause dielectric breakdown along a post insulator surface. Particle trap systems are arranged in the jacket pipes of gas-insulated lines to take up the particles.

It is known for example from European Patent EP 0 519 228 B1 to provide a particle trap system with a protective coating which dielectrically bonds particles to the surface thereof.

The protective coating is applied to suitable surface regions inside the pipe, the top layer of the protective coating taking the form of a film. During maintenance, the film is removed manually, with the particles adhering thereto. The removal of such films is restricted to readily accessible areas, i.e. in the vicinity of openings etc. Moreover, there is a risk, when removing the film, of particles becoming detached or of new foreign particles being introduced into the pipe.

To increase operational reliability it is desirable also to reach pipe portions which are difficult to access and not to introduce any new foreign particles into the pipe during removal of the particles.

SUMMARY OF THE INVENTION

The object of the present invention is to indicate a method for maintaining a pipe, with which portions which are difficult to access may be simply reached for maintenance purposes.

The object is achieved according to the invention with a method of the abovementioned type, in that a maintenance unit is moved along the particle trap system and the particle trap system guides the maintenance unit.

Maintenance is understood to mean the inspection and/or cleaning of particle trap systems, for example. Maintenance operations may take place for example during construction of an installation, prior to start-up of an installation or indeed during the service life of an installation.

Introducing a maintenance unit into the pipe and guiding it by means of the particle trap system offers the advantage that maintenance operations can be performed in pipe portions several kilometers long. This is not possible with the hitherto conventional manual methods. The inner conductor and the post insulators do not have to be removed from the pipe for maintenance operations, since the maintenance unit is guided reliably around the bearing points of the post insulators through guidance by means of the particle trap system. Using the particle trap system as a guide system offers the further advantage that reference points are present along the pipe which do not have to be additionally installed. The maintenance unit is guided close to the areas in which particles preferentially collect.

Provision may advantageously be made for the maintenance unit to be guided by a detection means detecting the particle trap system.

The detection means may be arranged directly on the maintenance unit or located at a distance therefrom on the pipe. The detection means may detect the particle trap system for example by using optical, acoustic or electromagnetic signals. For example a detection means may be mentioned which detects a specific coloring of the particle trap system. In the case of large distances between individual particle traps of a particle trap system, acoustic signals, which are emitted by an emitter on each particle trap, may communicate the position and order of the particle traps to the detection means by means of a frequency sequence. A particle trap system consisting of individual spaced particle traps may be detected by a detection means for example using static fields, whose field lines point from one particle trap to the next. Such a field line profile may be produced by applying an electrical potential alternating from particle trap to particle trap to an electrically insulated element on each particle trap. A further possible way of detecting the particle trap system using the detection means consists in the detection means scanning a cable which is stretched along the particle trap system. In another method of detecting the particle trap system, the detection means may use a track on the inner face of the pipe, said track being oriented towards the particle trap system. The track may be a coat of paint or generally a coating with surface properties which differ from the surface properties of the inner face of the pipe. The detection means responds to this difference.

It may also be deemed advantageous for a particle trap system shape arranged continuously along the pipe to be detected.

Such a particle trap system may extend along an imaginary line on the inner face of the jacket pipe and consist for example of individual indentations, raised portions or combinations thereof. The distances between the individual particle traps may be regular or irregular. Likewise, the particle traps may be located merely in the vicinity of the imaginary line or follow it exactly. A sequence of individual groups of particle traps along a path, for example mushroom-shaped raised portions on the inner face of the pipe, is likewise feasible. All these continuously arranged particle trap system shapes may advantageously guide the maintenance unit along a short path—namely the imaginary line—through the pipe along all the particle traps.

In a further advantageous development of the method, the detected, continuously arranged particle trap system shape is formed by at least one strand-type element.

The strand-type element is formed by a three-dimensional, cohesive body, which extends further in the longitudinal direction than in the transverse direction. The body does not need to extend in a strictly linear manner, but rather may be formed along a winding curve. The body may also exhibit torsion. The strand-type element may however also be formed by a recess in a wall of the pipe in the form of the above-described body or of a combination of the two. The strand-type element may extend over the entire length of the pipe. If there are a plurality of strand-type elements, these may be spaced at the ends or abut one another. The cross-section of the strand-type elements does not necessarily have to be constant, but rather forms field-free spaces as a result of its shape and may comprise advantageous devices for influencing the field profile. Shapes which reliably ensure that the particles remain in the particle traps may also be present. Subsequent installation of the strand-type elements on the pipe may be dispensed with if these are formed directly during production of the pipe. However, the strand-type elements may also be fixed in the pipe later, for example as narrow, long metal plates, by spot welding. As a result of their constant shape, the strand-type elements allow continuous detection by the detection means and thereby reliable guidance of the maintenance unit along the particle trap system.

It may also be deemed advantageous for the strand-type elements to be of web-type construction.

A web-type element comprises at least one web which projects beyond an adjacent surface and is formed by a strand-type element. The web-type element may be connected in one piece with the pipe. The cross-section of the raised portion shape may be T-shaped or of circular construction, for example. The web-type element may also adjoin the inner face of the pipe, however. This embodiment may be subsequently readily installed in the pipe. The elements may be metal pipes, for example, which are inserted in the lower area of the pipe along a line. An important factor in this respect is that as a result of the shaping a field-free space is produced which has a connection to the interior space of the pipe.

Advantageously, provision may additionally be made for the particle trap system to be of channel-type construction.

If the channel is sufficiently deep, there is a high probability of particles remaining in the field-free spaces of the indentation. Projections may be arranged on the channel in the area of the inlet, these reducing the size of the inlet in the manner of a funnel. This makes it more difficult for the particles to migrate back into the interior of the pipe.

Provision may advantageously be made for the detection means to be in physical contact with the particle trap system.

By way of example, a recess in the maintenance unit may here be mentioned which encompasses a web-type particle trap system. A further embodiment of a detection means is a gripping arm. This is shaped in such a way at its upper end that it may be coupled using the lock and key principle to the points provided therefor on the particle traps. The gripping arm is attached to the maintenance unit by a joint and consists of a succession of connection pieces and joints, which may be spatially oriented in such a way by means of a controller that the gripping arm may scan the surrounding area for particle traps within its range. The detection means may additionally be designed as a means of conveying the maintenance unit. Thus, the maintenance unit may for example be conveyed by retraction of the coupled-on gripping arm. Another variant uses a gearwheel, which upon rolling acts on a structure provided therefor on the particle trap system. In order to detect the particle trap system, the detection means may also take the form of a passive spacer. In this case it may be a clip, which comprises an arcuate curvature as connection piece and with the latter adjoins or is connected to a surface or body edge of the particle trap system. The clip may slide along an auxiliary structure arranged between the particle traps, such as for example a taut cable.

The maintenance unit may be guided along strand-type elements by means of rollers which advantageously produce only few abraded particles during rolling movement. The rollers may be made from hard plastics and be attached to the maintenance unit in such a way that they press against the strand-type element on both sides. This gives rise to lateral guidance of the maintenance unit along the strand-type element.

It is a further object of the invention to provide a suitable maintenance unit for carrying out the method.

In an advantageous development of the maintenance unit for carrying out the method, cleaning elements may be attached to the maintenance unit, these elements detaching and/or transporting particles chemically and/or mechanically and/or by means of pressure and/or by means of electrical and/or magnetic fields from a particle trap of the particle trap system.

The cleaning elements may for example be rotating brushes, which are wetted with a solvent, or a rubber lip, which is guided along the particle trap. The rubber lip may push the particles into the vicinity of a suction pipe or the suction pipe may be constructed in such a way that it sucks the particles directly out of the trap. Cleaning elements are also feasible which detach the particles by means of ultrasound and then suck them up. In the case of particle trap types which are difficult to access, a probe may be used as the cleaning element. The probe may be a thin metal pin which reaches inside the particle traps and has a tip at the end to which a suitable electrical potential is applied. The high field strengths at the tip may draw particles to the tip, such that they can be removed from the trap together with the probe.

Provision may also advantageously be made to convey an optical detection means on the maintenance unit to monitor a maintenance portion.

This may for example be a video camera, which is attached swivelably to the maintenance unit and records the maintained area within its field of view during the journey along the pipe. If this monitoring reveals particles remaining behind or particles which may have been newly introduced by the maintenance process in the area of the particle trap system, maintenance may optionally be repeated. This measure improves the operational reliability of the installation.

It is a further object of the invention to provide a suitable pipe for carrying out the method.

Provision may advantageously be made for guide elements to be arranged in the pipe on the particle trap system.

The guide elements may comprise structures on the particle trap system which cooperate with detection means. For example, pyramid-shaped points may be arranged along the particle trap system, these cooperating with a gearwheel. Developments necessary for functioning of the particle trap system may also be used. A bulge on the particle trap system, along which the detection means may slide and which at the same time forms a field-free space is one exemplary embodiment for a guide element which forms an essential part of the particle trap system.

An exemplary embodiment of the invention is described below and illustrated schematically in drawings, in which

DESCRIPTION OF THE PREFERRED EMBODIMENTS

Figure 1:
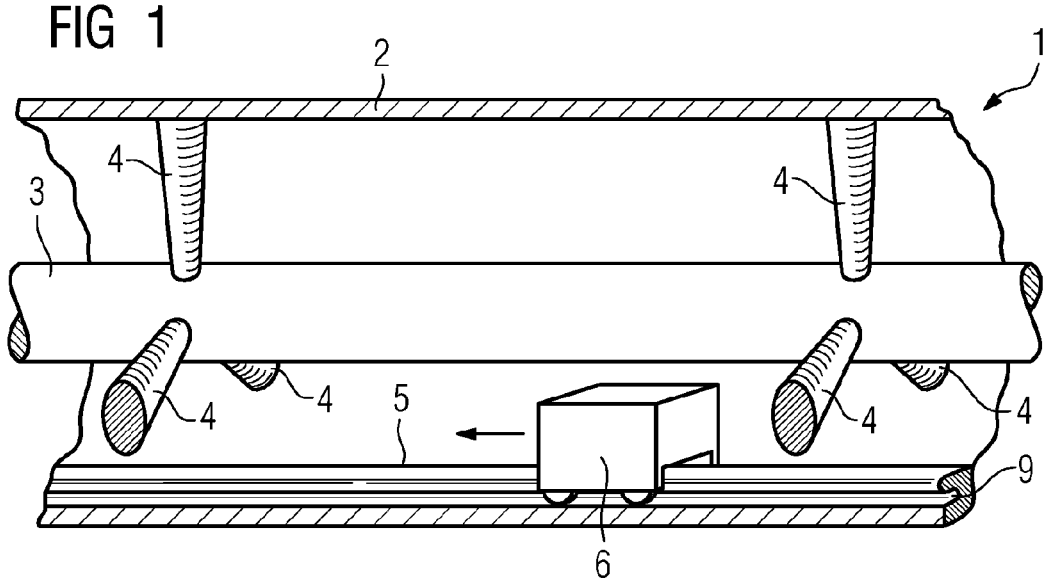
FIG. 1 shows a cut-open line portion of a gas-insulated high voltage line.

A high voltage line 1 comprises an electrical conductor 3 extending along an axis, which conductor is surrounded coaxially by a jacket pipe 2. The electrical conductor 3 is held in place within the jacket pipe 2 by columnar post insulators 4. The electrical conductor 3 serves to convey an electrical current and, when the installation is in the operating state, has a high voltage potential applied to it. The jacket pipe 2 consists for example of an electrically conductive material, for example aluminum, and is connected to ground potential. In the operating state the jacket pipe 2 is closed and filled with a suitable insulating gas. To improve dielectric strength, the gas is under an elevated pressure. The post insulators 4 are arranged at regular intervals along the electrical conductor 3. The post insulators 4 are columnar in shape and extend radially between the electrical conductor 3 and the jacket pipe 2. In the example shown in FIG. 1 the post insulators 4 are in each case arranged in groups of three around the electrical conductor 3 in such a way that in each case two post insulators span the lower area of the horizontally extending pipe. A particle trap system 5 extends in this lower area of the pipe. The exemplary embodiment of a particle trap system 5 shown in FIG. 1 is formed by a web-type raised portion adjoining the jacket pipe 2, said raised portion extending without interruption along the jacket pipe 2 and having a T-shaped cross-section (see FIG. 2). A particle trap of this design has an electrically conductive surface. If a direct or alternating voltage is applied to the electrical conductor 3 in the operating state, the electrical conductor 3 is surrounded by an electrical field. The particle trap surfaces exhibit a common electrical potential. Field-free spaces thus arise in the area of recesses in the particle trap surface. The web-type particle trap system 5, illustrated in FIG. 1, of T-shaped cross-section (see FIG. 2) is connected in an electrically conductive manner to the jacket pipe 2 and has recesses which form field-free spaces on either side of the raised portion relative to the axis. The recesses form channels extending along the pipe. Particles which are located in the jacket pipe 2 when voltage is applied to the electrical conductor 3 may be caused to move by the electrical field arising. Under the additional influence of gravity, the particles execute a movement which on average is directed in the direction of the lower area of the jacket pipe. Preferably, the particle traps are arranged in the lower area, so that particles enter the field-free spaces and are highly likely to remain therein. Otherwise, particles wandering around uncontrolledly in the electrical field could lead to partial discharges.

Since it cannot be ruled out that particles already in the particle traps may escape therefrom again, it is desirable to maintain the particle traps. The collected particles may be taken up by a maintenance unit 6, which travels along the particle trap system 5. As shown in FIG. 1, the maintenance unit may be positioned to this end on the particle trap system. The post insulators 4 illustrated in FIG. 1, which span the lower area of the horizontally extending jacket pipe 2, leave sufficient space for the maintenance unit 6 positioned on the particle trap system 5 to pass through under the post insulators 4. The maintenance unit 6 may comprise a propulsive mechanism. This may, for example, be a battery-operated electric motor which drives the wheels 7 on the maintenance unit. The maintenance unit 6 may also be externally driven, however. For example, the maintenance unit 6 may be drawn through the line portion to be maintained along the web-type particle trap system 5 by means of a Bowden cable, not shown in FIG. 1.

So that the maintenance unit travels along the particle trap system 5, it may comprise detection means. These cooperate with the particle trap system 5. Guide elements, for example special profiling, may additionally be located on the particle trap system 5 and cooperate with the detection means. The maintenance unit 6 comprises rollers 8 as detection means, these being in physical contact with the strand-type elements of the particle trap system 5 and performing a rolling movement therealong. The particle trap system 5 may be a succession of strand-type elements, not shown here, which are spaced from one another. Different detection means are feasible depending on the size of these spaces. For example, the rollers 8 attached to the maintenance unit may bridge spaces during their rolling movement along the strand-type elements. In the case of larger spaces between the strand-type elements, the maintenance unit 6 may for example be guided by means of one or two elongate runners, which are attached to the maintenance unit and slide along the strand-type element resting on one or both sides thereof. In the case of even larger spaces, guide elements may be arranged between the strand-type elements, said guide elements pointing the detection means in the right direction. Guide elements may be provided on the particle trap system which connect together spaced particle traps, for example, a cable stretched between the particle traps or a track on the inner face of the pipe. The guide elements may however also be structures on the particle traps, for example, special coloring of the particle traps, which is detected by the detection means.

Figure 2:
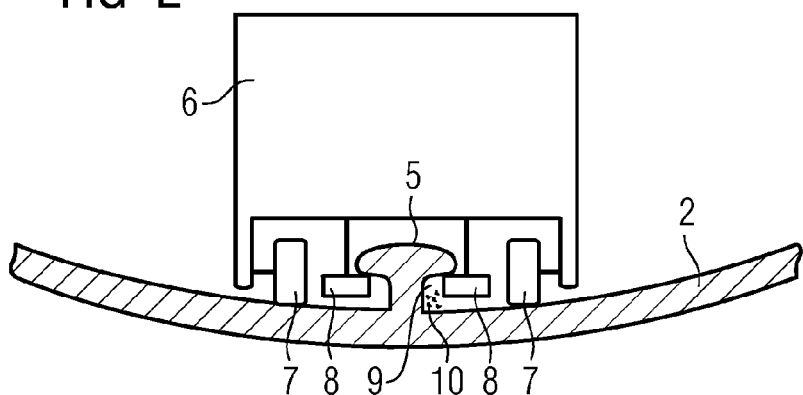
FIG. 2 shows a portion of a gas-insulated high voltage line in cross-section.

FIG. 2 shows the lower area of the horizontally extending high voltage line in cross-section. The web-type particle trap system 5 has a T-shaped cross-section. The maintenance unit 6 is positioned on the particle trap system 5. The maintenance unit 6 comprises a running gear. In the case of the maintenance unit 6 illustrated in FIG. 2, the running gear is formed by web-type extensions of the lower longitudinal edges, which accommodate axles of the wheels 7. Further devices may also be arranged on the maintenance unit. In FIG. 2, guide rollers 8 are arranged on the side of the maintenance unit 6 facing the particle trap, these guide rollers acting as detection means. To this end, the guide rollers 8 engage in the profile of the web-type particle trap system. While the guide rollers 8 restrict the movement of the maintenance carriage 6 to the profile of the web-type particle trap, the driven wheels 7 (driven for example by an electric motor) of the maintenance unit 6 allow movement along the particle trap system 5. Further detection means, not shown, will be mentioned below which are capable of detecting a particle trap system by means of physical contact. For example, the guide rollers 8 may be replaced by brushes, which on the one hand act as cleaning elements and on the other hand exhibit sufficient dimensional stability to serve as detection means. In another embodiment the rollers are replaced by clips, which grip with an arcuate area under the profile of the web-type particle trap system and slide therealong. In another embodiment the clips are formed from a dimensionally stable suction pipe, such that the suction pipe acts on the one hand as cleaning element and on the other hand as detection means. If the particle trap system takes the form of a channel-shaped recess in a wall of the jacket pipe 2, a web- or peg-type element may be used as detection means which fits exactly in the channel.

The above-described detection means may likewise be used with modifications. The detection means have to this end to engage in a corresponding profile of the channel or rest in such a way against an internal wall of the channel that guidance of the maintenance unit along the particle trap system is possible.

Figure 3:
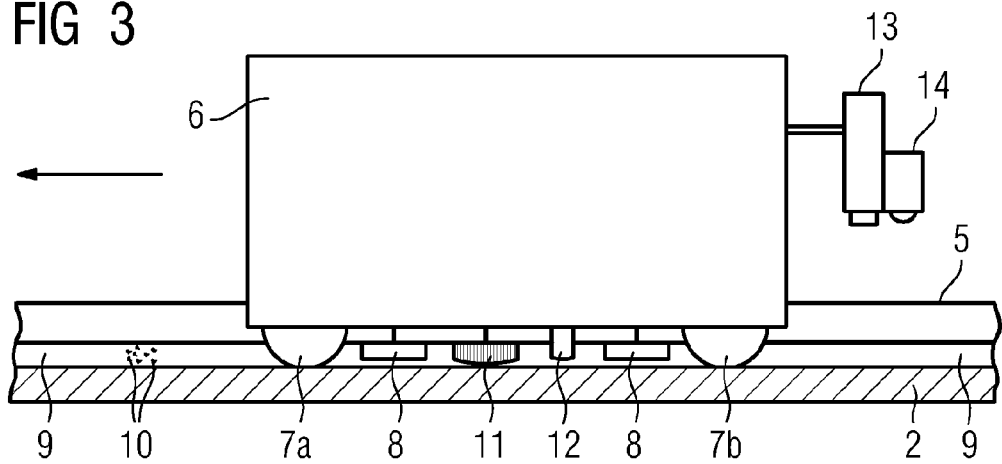
FIG. 3 shows a detail of the line portion in side view.

FIG. 3 shows a cut-open line portion of a gas-insulated line 1 in side view. The portion is a side view of the lower area of the horizontally extending jacket pipe 2 with the maintenance carriage 6 cooperating with the web-type particle trap 5. Of the two field-free spaces 9, which are located on either side of the T-shaped cross section (see also FIG. 2) of the particle trap system 5, one of the two field-free spaces 9 is shown in side view in FIG. 3. Particles 10 collected in the field-free space 9 are shown schematically in FIG. 3. Positioned on the particle trap system 5 is the maintenance unit 6, whose running gear comprises four wheels 7, of which two are illustrated in FIG. 3. The wheels 7 lie on the jacket pipe 2 on either side of the web-type particle trap system 5. Guidance of the maintenance unit 6 along the particle trap system 5 is brought about by the detection means. In FIG. 3 guide rollers 8 which grip under the profile of the web-type particle trap are attached to the maintenance unit 6 as detection means. In the exemplary embodiment illustrated in FIG. 3, cleaning elements are arranged under the maintenance unit. A rotating brush 11 acting as a cleaning element is arranged next to the guide roller 8 and may be wetted with cleaning agent, e.g. acetone. The rotating brush detaches particles 10 from the field-free spaces 9 and projects them in the direction of a suction pipe acting as cleaning element. The brush 11 is rotated at a speed suitable for ensuring that detached particles are not projected past the suction pipe 12. During suction, the cleaning agent applied may be recovered. The cleaning elements may be attached to the maintenance unit 6 on either side of the particle trap system 5. To monitor the maintenance process, a video camera 13 and a lamp 14 are arranged swivelably on the carriage in such a way that the field-free space lying in the detection range of the video camera is illuminated and may be recorded.

The invention claimed is:

1. A method of maintaining a pipe having a particle trap system extending along the pipe, the method which comprises:
    moving a maintenance unit along the particle trap system in the pipe; and
    guiding the maintenance unit with the particle trap system.

2. The method for maintaining a pipe according to claim 1, wherein the guiding step comprises guiding the maintenance unit by way of a detection means detecting the particle trap system.

3. The method for maintaining a pipe according to claim 2, which comprises detecting a shape of the particle trap system arranged continuously along the pipe.

4. The method for maintaining a pipe according to claim 3, wherein the continuously arranged shape is formed by one or more strand-shaped element.

5. The method for maintaining a pipe according to claim 4, wherein the strand-shaped element includes a raised portion projecting beyond an internal wall of an encapsulating pipe.

6. The method for maintaining a pipe according to claim 4, wherein the strand-shaped element is formed in groove shape.

7. The method for maintaining a pipe according to claim 2, which comprises placing the detection means in physical contact with the particle trap system.

* * * * *